United States Patent [19]
Berthet et al.

[11] Patent Number: 4,799,788
[45] Date of Patent: Jan. 24, 1989

[54] PROCESS FOR MEASURING THE TEMPERATURE OF A BODY BY OPTICAL DETECTION AND MODULATED HEATING

[75] Inventors: Olivier Berthet, Vanves; Jean-Jacques Greffet, Antony; Yves Denayrolles, Le Vesinet, all of France

[73] Assignees: Electricite de France Service National, Paris; Ecole Centrale des Arts et Manufactures de Paris, Chatenay Malabry, both of France

[21] Appl. No.: 82,549

[22] Filed: Aug. 7, 1987

[30] Foreign Application Priority Data

Aug. 8, 1986 [FR] France .................... 86 11542

[51] Int. Cl.⁴ ............................ G01J 5/06; G01J 5/60
[52] U.S. Cl. ........................................ 356/45; 374/121
[58] Field of Search ................ 346/43, 45; 374/121, 374/130

[56] References Cited

U.S. PATENT DOCUMENTS 3,884,075 5/1975 Brandli et al. .................... 356/47
4,708,493 11/1987 Stein ................................ 356/45 X

FOREIGN PATENT DOCUMENTS 2153077 4/1973 Fed. Rep. of Germany .

OTHER PUBLICATIONS

Patent Abstracts of Japan, vol. 5, No. 201 (P-94) [873], Dec. 19, 1981; & JP-A-56 122 924 (Hideo Takada) 26-09-1981.
Journal of Physics E, Scientific Instruments, vol. 13, No. 3, mars 1980, pp. 306-310, The Institute of Physics, Bristol, GB.
J. L. Gardner et al.: "Multi-wavelength Radiation Pyrometry where Reflectance is Measured to Estimate Emissivity" p. 306.
Mechanical Engineering, vol. 94, No. 7, Juillet 1972, pp. 12-15, New York, US; G. D. Nutter: "Radiation Thermometry" pp. 13, 15.
Rudiger Brandt, Gunther Neur, Thermal Diffusivity of Solids 1979-High Temp-High Pressures, vol. 11, pp. 59-68.

*Primary Examiner*—Richard A. Rosenberger
*Attorney, Agent, or Firm*—Oblon, Fisher, Spivak, McClelland & Maier

[57] ABSTRACT

A process for measuring the temperature of a body by optical detection is disclosed wherein the body is heated by a modulated light beam and the radiation coming from the object is detected. The modulated component of the detected signal is measured and the temperature of the body is extracted by signal processing.

3 Claims, 1 Drawing Sheet

PROCESS FOR MEASURING THE TEMPERATURE OF A BODY BY OPTICAL DETECTION AND MODULATED HEATING

BACKGROUND OF THE INVENTION

1. Field of the Invention

This invention has as its object a process for measuring the temperature of a body by optical detection and modulated heating. The process of the invention comes under pyrometry, which is a remote temperature measuring technique.

The process of the invention makes it possible to extend the use of pyrometry to reflecting bodies and to bodies placed in radiating environments. Cases of typical use are:

temperature measurements of objects placed in furnaces, temperature measurements of reflecting bodies (polished metals, for example).

2. Discussion of Background

Traditional pyrometer runs up against two difficulties which are the following:

(a) the radiation coming from the body whose temperature it is desired to measure is the sum of the radiation emitted by this body and of the radiation reflected by it. Only the radiation emitted by the body depends on the temperature. Therefore, we are bound by a first condition: the reflected flux has to be negligible compared with the emitted flux. It is impossible, for example, to measure the temperature of a very reflecting body or of a body placed in an environment which radiates strongly. This is the case, for example, for polished metals or materials placed in a furnace;

(b) assuming this first problem is solved, there remains a second which is that the amount of radiation detected is proportional to the emitted flux, which is the product of a known function of the temperature (which is the luminance of the ideal blackbody) and of the emissivity of the body studied, which is a characteristic of the sample. Now, this quantity is generally unknown and depends, in particular, on the surface state in the case of solid bodies.

This invention has as its object to overcome these two difficulties.

SUMMARY OF THE INVENTION

According to the invention, the body to be measured is locally superheated, for example with a light beam focused on the surface of this body. In this case, a local heating results which is a known effect called photothermal effect. The exciting beam is modulated in intensity, which creates a modulation of the temperature. The radiation coming from the body studied is then the sum of an emitted flux which is modulated in time, a constant emitted flux and a reflected flux which is itself constant. It is then easy to get rid of these two latter fluxes by processing only the first which is the only modulated one. Thus the first snag mentioned above is avoided. As for the second, it is also avoided by an appropriate signal processing which makes it possible to become free of the emissivity of the body, which remains unknown.

More specifically, this invention has as its object a process for measuring by optical detection the temperature of a body, which is free of spurious fluxes emitted by the environment and which is characterized by the fact that the following operations are performed:

a modulated heating is caused of the zone of the body whose temperature it is desired to measure, the thermal radiation coming from this zone is detected in at least one wavelength range which provides an electric signal having a continuous component and a modulation component, the modulation component independent of the reflected fluxes is extracted from the electric signal, this component being a function of the emissivity of the object at the detection wavelength and of the temperature of the body by the derived function in relation to the temperature of the luminance of a blackbody, by an acquisition and a processing of the appropriate measurements, the temperature of the object is extracted from the modulation component.

DESCRIPTION OF THE PREFERRED EMBODIMENT

The modulated heating can be produced by an optical radiation that is modulated in intensity and that is directed on the zone to be measured. But the heating can also be produced by an induction furnace whose supply current is modulated.

In a first variant:

the thermal radiation is detected at a first wavelength and at a second wavelength, for each of these wavelengths, the modulation component—which has the same frequency as the modulation frequency of the heating—is extracted from the signal, this component being proportional to the product of the monochromatic emissivity of the object and of the derivative of the luminance in relation to the temperature, the ratio of the two components thus obtained is computed for these two wavelengths, this ratio being assumed to be independent of the emissivity of the object and being only a function of the temperature of the body by a function which is the ratio of the derivatives of the luminance in relation to the temperature, from the value of this ratio, the temperature of the body is computed by inversion of the function in question.

In a second variant:

the intensity of the modulated heating is made to vary, the variation of the modulation component of the electric signal is noted, a variation which comprises a linear term and a quadratic term in relation to the intensity of the modulated heating, the ratio of these two terms is formed, which no longer depends on the emissivity of the body, strictly in this variant, but on the temperature of the body, by working at two wavelengths, two ratios R1, R2 are obtained from which ratio R' is formed which depends only on the temperature.

Naturally, other variants can be imagined. For example, there can be detected in the modulated signal not the component having the modulation frequency, but the component having a double frequency.

As for the modulation of the light beam, in practice an all-or-nothing modulation will be used for convenience, but more sophisticated modulations or techniques using a pulse heating can be imagined.

All these questions can be specified more in the following manner. The luminance of an ideal blackbody is a function of the temperature T of this body that will be identified as L(T). This function is known by the name of Planck Function. In the invention, temperature T is the sum of temperature To of the body and of a heating term due to the energy input coming from the light beam. While being limited to the first terms of the development, it can be noted:

$$T = To + DTo + DT1 \exp(jwt)$$

where DTo is a continuous component of the heating, DT1 is a component linked to the modulation and w the pulsation of the modulation of the beam (i.e., in practice, the first harmonic corresponding to the occultation of the beam).

Moreover, there is a flux reflected by the object, that can be identified as Lr.

The flux coming from the body is therefore in the form E.L(T)+Lr, where E is the monochromatic emissivity of the body.

The hypothesis can be made, well verified in practice, that emissivity E and the reflectivity vary much more gradually with the temperature than the function L(T). The dependence of the flux with respect to T therefore holds only in the function L(T) as regards the slight variations which concern us. Finally, the detected signal will have the form:

$$S = k.E.[L(To + DTo) + Lr] + k.E.\left(\frac{\partial L}{\partial T}\right)_{To} DT1 \exp(jwt)$$

where k is a constant dependent on the wavelength and characteristic of the experimental device and where $\alpha L/\alpha T$ represents the partial derivative of luminance function L in relation to temperature T, this derivative having to be taken at temperature To. The first term is a constant term. Only the second is variable in time.

Extraction of the modulated part corresponding to this second term can be done by a high-pass filter, or by a simple connecting capacitor, or by synchronous detection. Therefore, there is finally obtained a quantity s of the form:

$$s = kE\left(\frac{\partial L}{\partial T}\right)_{To} \cdot DT1,$$

where DT1 depends on the power of the light radiation sent to the body.

Extraction of temperature To from this quantity s is not possible, because the value of monochromatic emissivity E is not known. To resolve this difficulty, the measurement is made at two different wavelengths, as in bichromatic pyrometry. Two signals s1 and s2 are then obtained where the two emissivities E1, E2 intervene at the two wavelengths in question. If it is assumed that these two quantities are equal for appropriate wavelengths, ratio s1/s2 is a quantity R where the emissivity no longer appears:

$$R = \frac{\left(\frac{\partial L1}{\partial T}\right)_{To}}{\left(\frac{\partial L2}{\partial T}\right)_{To}}$$

where L1 and l2 designate the luminances respectively at the two wavelengths used. This ratio is a function of the temperature alone, a function that is known theoretically and that can be inverted, which means that temperature To can be found by knowing the value of ratio R.

More specifically, from the Planck function that reflects the luminance as a function of temperature, it can be shown that the ratio in question can be written:

$$R = \left(\frac{\lambda 2}{\lambda 1}\right)^{-6} \exp\left[-\frac{C}{To}\left(\frac{1}{\lambda 1} - \frac{1}{\lambda 2}\right)\right]$$

where $\lambda 1$ and $\lambda 2$ are the two wavelengths used and where C is equal to $h_c/k$ where h is the Planck constant, c the speed of light in a vacuum and k the Boltzman constant. Thus knowing R, and the two wavelengths $\lambda 1$ and $\lambda 2$, To is easily deduced by inversion of the exponential function.

In a second variant making it possible to be free of the bichromatic hypothesis, the development of the luminance function is pushed up to the quadratic term which follows the linear term. This term s' has the form:

$$kE\left(\frac{\partial^2 L}{\partial T^2}\right)_{To} DTo \cdot DT1 \exp jwt$$

If the ratio of this term s' of the second degree is made with the term s of the first degree already mentioned, a ratio is obtained from which emissivity E has been eliminated, but in a precise way this time.

To eliminate DTo, ratio R' is formed from the two ratios R1 and R2 obtained at two different wavelengths.

BRIEF DESCRIPTION OF THE DRAWINGS

Putting the process of the invention into practice will be better understood in light of the following description which refers to accompanying drawings in which.

DESCRIPTION OF THE PREFERRED EMBODIMENT

Figure 1:
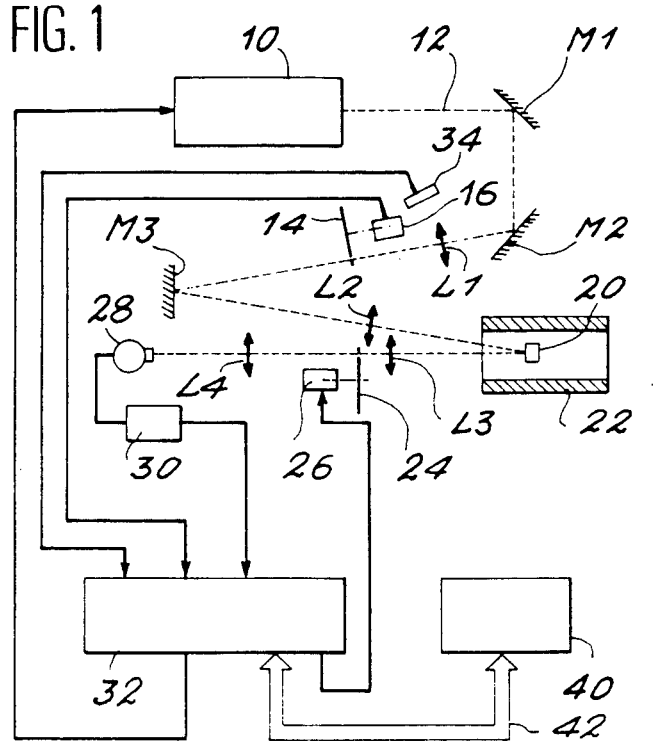
FIG. 1 represents an example of embodiment of a device for measuring temperature.

In FIG. 1, there is seen a laser 10, for example, an ionized argon laser, emitting a light beam 12 sent back by mirrors M1, M2 to a first lens L1, a chopper consisting of a disk 14 driven in rotation by a motor 16, a third mirror M3 and a second lens L2 which focuses the light beam on object 20 whose temperature it is desired to measure. In the example of embodiment illustrated, this object is placed in a furnace 22. A third lens L3, for example of CaF$_2$, collects the flux emitted by the object. Interferential filters are mounted on a support 24 and can be positioned in the beam by means of a motor 26. These filters can work for example at 1.71; 1.97; 2.1 and 2.2 $\mu$m. A fourth lens L4 focuses the beam thus filtered on a photodetector 28, which can, for example, be of InSb. An amplifier 30 amplifies the modulated part of the detected signal. The amplified signal is applied to a demodulation circuit 32 called "Lock-in amplifier," which in addition receives a reference signal from chopper 14. Circuit 32 extracts from the signal received the part which is at the occultation frequency of the beam, for example by means of a synchronous demodulation. Circuit 32, moreover, comprises a microprocessor which is able to control the positioning of appropriate interferential filter 24 by action on motor 26 and the power emitted by laser 10.

Moreover, the device represented comprises a diode 34, for example of silicon, which makes it possible to control the power emitted by the laser. The corresponding information is transmitted to circuit 32.

A computer 40, for example an APPLE II, controls the power variation of the laser, and performs the signal processing making it possible to invert the measured function to find the temperature of the sample, as explained above. Computer 40 is connected to circuit 32 by a bus 42, for example of the type IEEE 488.

Figure 2:
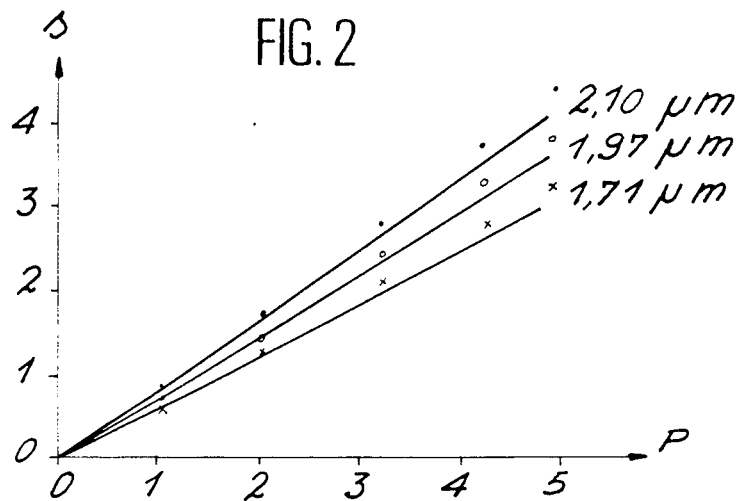
FIG. 2 shows variation curves of the signal detected as a function of the power of the light source.

FIG. 2 shows an example of results obtained with this device. The amplitude s of the photothermal signal is represented as a function of power P of the laser. These two magnitudes being plotted in arbitrary units. Three series of measuring points corresponding to three wavelengths transmitted three different interferential filters working respectively at 1.71; 1.97 and 2.10 $\mu$m are seen. The straight lines show the slope of the curve at low power. The deviation between the points and the straight lines, at high power, reflects the appearance of a quadratic term. These are the two terms (linear or quadratic) which are used in the two variants described above.

Naturally, it goes without saying that a laser other that an ionized argon laser can be used, for example a $CO_2$ laser emitting at 10.6 $\mu$m. Also, the laser can be abandoned and a simple lamp can be used, for example a xenon, or mercury, or sodium lamp. The light can also be guided toward the object to be measured by an optical fiber and take up the flux emitted by another optical fiber.

Any other periodic heating mode, local or not, can be used.

The measurements made by the applicants with this installation on a steel sample have proved accurate to nearly ±2% over a range of temperatures going from 600° to 1200° K. The real temperature of the sample was measured directly by a thermocouple.

Finally, it can be observed that it is already known to send a modulated light beam on an object and to detect the infrared radiation coming from this object. These techniques and their applications were reviewed in the articles of Messrs. Nordal et al "New Developments in Photothermal Radiometry," Infrared Phys., vol 25, 1985 and of A. C. Tam "Pulsed Photothermal Radiometry for nonconstant spectroscopy, material testing and inspection measurements," Infrared Phys., vol 25, 1985. But in these techniques, it is primarily a matter of inspecting a sample in a nondestructive manner. If the sample comprises internal defects or divergences sufficiently affecting the optical properties and/or the thermal propagation conditions near the surface, they can be detected by observation of the modifications of the infrared periodic signal emitted by the excited surface.

Therefore, in no case does it involve a process making it possible to measure a temperature. This possibility of attaining the temperature of a body results from the theoretical work and experiments of the applicants mentioned above. This measurement necessitates an original signal processing (use of the first linear term or of the linear and quadratic terms), a processing which is not taught in the cited document.

Moreover, the paradoxical side of the invention can be stressed which is due to the fact that the magnitude that it is desired to measure (the temperature) is modified by an outside supply of heat. In the known prior art using "thermal waves" [seven or eight words illegible] it was a question of inspecting consisted of a quality of a piece, a quality having nothing to do with the temperature. In other words, in the prior art, it was a question of a photothermal radiometry, whereas in the invention it is a matter of a photothermal pyrometry.

We claim:

1. A process for measuring by optical detection the temperature of a body comprising the steps of:
   producing a modulated heating of a zone of said body;
   detecting thermal radiation coming from said zone in a first and second wavelength rang in order to provide an electric signal having a continuous component and a modulated component;
   extracting from said electric signal for each of said first and second wavelengths the modulation component which has the same frequency as the modulation frequency of the heating wherein said modulation component is proportional to the product of the monochromatic emissivity of said body and of the derivative of the luminace of a black body with respect to the temperature;
   obtaining a first ratio of said two extracted modulation components for said first and second wavelengths respectively wherein said first ratio is assumed to be independent of the emissivity of the object and wherein said first ratio is a function of the temperature of said body, wherein said first ratio is formed by using only the portion of said product of each of said modulation components which is proportioned to said derivative of said luminance in relation to the temperature;
   computing from said first ratio by inversion of said function of the luminance, the temperature of said body.

2. The process according to claim 1 wherein said modulated heating is produced by an optical radiation which is modulated in intensity and wherein said radiation is directed on said zone of said body whose temperature is desired to be measured.

3. A process for measuring by optical detection the temperature of a body, comprising the steps of:
   producing a modulated heating of a zone of said body;
   varying the intensity of said modulated heating;
   detecting the thermal radiation coming from said zone and providing an electric signal having a continuous component and a modulated component wherein said modulated component varies in accordance with said variation in the intensity of said modulated heating and wherein said variation of said modulated component comprises a linear term and a quadratic term with respect to the intensity of the modulated heating;
   forming a first ratio of said quadratic term with respect to the intensity of the modulated heating;
   forming a first ratio of said quadratic term to said linear term wherein said first ratio results in a function dependent on the temperature of the body but independent of the emissivity of the body;
   forming a second ratio by detecting said thermal radiation in a second wavelength range different from said first wavelength range to thereby form a first and a second ratio respectively;
   forming a third ratio consisting of said first ratio divided by said second ratio wherein said third ratio provides a quantity which depends only on the temperature of said body; and
   computing the second derivative of the luminance of a black body;
   computing by inversion of said second derivative of said luminance, and the value of said third ratio, the temperature of said body.

* * * * *